United States Patent
Wahlen et al.

(10) Patent No.: US 10,023,076 B2
(45) Date of Patent: Jul. 17, 2018

(54) BACKREST ADJUSTER FOR A VEHICLE SEAT, AND VEHICLE SEAT

(71) Applicant: Johnson Controls Technology Company, Plymouth, MI (US)

(72) Inventors: Hilmar Wahlen, Hückeswagen (DE); Thorsten Klein-Hitpass, Köln (DE); Ulli Genutt, Much (DE); Ludger Mühlenbrock, Recklinghausen (DE)

(73) Assignee: Johnson Controls Technology Company, Plymouth, MI (US)

( * ) Notice: Subject to any disclaimer, the term of this patent is extended or adjusted under 35 U.S.C. 154(b) by 107 days.

(21) Appl. No.: 15/035,847

(22) PCT Filed: Nov. 12, 2014

(86) PCT No.: PCT/EP2014/074363
§ 371 (c)(1),
(2) Date: May 11, 2016

(87) PCT Pub. No.: WO2015/071301
PCT Pub. Date: May 21, 2015

(65) Prior Publication Data
US 2016/0355107 A1    Dec. 8, 2016

(30) Foreign Application Priority Data

Nov. 12, 2013  (DE) .................. 10 2013 223 026

(51) Int. Cl.
*B60N 2/00*    (2006.01)
*B60N 2/22*    (2006.01)
(Continued)

(52) U.S. Cl.
CPC ................. *B60N 2/22* (2013.01); *B60N 2/20* (2013.01); *B60N 2/68* (2013.01); *B60N 2/682* (2013.01)

(58) Field of Classification Search
CPC ...... B60N 2/3004; B60N 2/3002; B60N 2/68; B60N 2/682; B60N 2/20; B60N 2/22;
(Continued)

(56) References Cited

U.S. PATENT DOCUMENTS 3,501,198 A    3/1970  Boyce
4,470,633 A *  9/1984  Fourrey .................. B60N 2/22
                                                  16/DIG. 24
(Continued)

FOREIGN PATENT DOCUMENTS

CN    21 81 428 Y    11/1994
CN    22 58 833 Y    8/1997
(Continued)

OTHER PUBLICATIONS

Chinese Office Action dated Apr. 1, 2017 w/translation.
Korean Office Action dated Jan. 11, 2017, with English translation.

*Primary Examiner* — Chi Q Nguyen
(74) *Attorney, Agent, or Firm* — McGlew and Tuttle, P.C.

(57) ABSTRACT

A vehicle seat and a backrest adjuster (1) for a vehicle seat are provided in order to adjust the inclination of a backrest (2.1) of a vehicle seat (2). The backrest adjuster includes a transmission element (5) that is coupled to a fitting (4) and to a pivot bearing (3). A clamping element (11) is mounted in the region of the pivot bearing (3) and in the region of the fitting (4) lying opposite the pivot bearing. In the region between the pivot bearing (3) and the fitting (4), the clamping element (11) is arranged at least in part in the transmission element (5).

20 Claims, 4 Drawing Sheets

(51) Int. Cl.
*B60N 2/68* (2006.01)
*B60N 2/20* (2006.01)

(58) Field of Classification Search
CPC .............. B60N 2/3011; B60N 2205/35; B60N 2/2356; B60N 2/2227; B60N 2/2213; B60N 2/235
USPC ........ 297/452.18, 452.2, 354.12, 183.2, 353, 297/354.1, 374, 362, 367 R
See application file for complete search history.

(56) References Cited

U.S. PATENT DOCUMENTS

| 5,090,264 | A | 2/1992 | Droulon et al. | |
|---|---|---|---|---|
| 5,224,759 | A * | 7/1993 | Matsuura | B60N 2/2352 297/367 R |
| 6,378,946 | B1 * | 4/2002 | Cope | B60N 2/64 297/452.18 |
| 6,520,584 | B1 | 2/2003 | Tame | |
| 7,172,253 | B2 * | 2/2007 | Haverkamp | B60N 2/3011 297/354.1 |
| 8,857,913 | B2 * | 10/2014 | Schuhmacher | B60N 2/2356 16/2.1 |
| 9,290,116 | B2 * | 3/2016 | Teufel | B60N 2/366 |
| 2008/0093907 | A1 * | 4/2008 | Nag | B60N 2/2356 297/367 R |
| 2009/0261224 | A1 | 10/2009 | Yamada et al. | |
| 2012/0292972 | A1 * | 11/2012 | Hofmann | B60N 2/20 297/354.12 |
| 2014/0319893 | A1 * | 10/2014 | Vatmakhter | B60N 2/682 297/463.1 |
| 2015/0097404 | A1 * | 4/2015 | Furuta | B60N 2/68 297/344.15 |
| 2015/0123442 | A1 * | 5/2015 | Linnenbrink | B60N 2/68 297/311 |
| 2016/0339809 | A1 * | 11/2016 | Wetzig | B60N 2/20 |

FOREIGN PATENT DOCUMENTS

| DE | 43 14 119 A1 | 11/1994 |
|---|---|---|
| DE | 10 2010 062122 A1 | 3/2012 |
| FR | 2990166 A1 | 11/2013 |
| JP | H11-099029 A | 4/1999 |
| JP | 2009 061834 A | 3/2003 |
| JP | 2007-112393 A | 5/2007 |

* cited by examiner

BACKREST ADJUSTER FOR A VEHICLE SEAT, AND VEHICLE SEAT

CROSS REFERENCE TO RELATED APPLICATIONS

This application is a United States National Phase Application of International Application PCT/EP2014/074363 filed Nov. 12, 2014 and claims the benefit of priority under 35 U.S.C. § 119 of German Patent Application 10 2013 223 026.5 filed Nov. 12, 2013, the entire contents of which are incorporated herein by reference.

FIELD OF THE INVENTION

The invention relates to a backrest adjuster for a vehicle seat for adjusting the inclination of a backrest of the vehicle seat. Furthermore, the invention relates to a vehicle seat with such a backrest adjuster.

BACKGROUND OF THE INVENTION

Vehicle seats, the backrests of which are adjustable in their inclination about a pivot axis and are also foldable forward, are known from the prior art. Customarily, such a vehicle seat has a backrest adjuster with a transmission shaft which is coupled on one side to a hinged fitting and on the other side to a rotary bearing or to a further hinged fitting. The at least one hinged fitting comprises a lower fitting part which is fixed on the seat frame and an upper fitting part which is fixed on the backrest, said fitting parts being adjustable relative to each other in order to adjust the inclination of the backrest.

U.S. Pat. No. 5,090,264 A discloses a movement mechanism in which two parts are connected to each other in an articulated manner by means of a rod. The mechanism is provided for pivotable seat elements, in particular for motor vehicle seats.

Furthermore, a motor vehicle seat with an inclination adjustable backrest is described in DE 4314119 A1. A bracing coupling is installed here in the connection of two drive elements and is intended to be used to prevent an undesirable automatic adjustment of the inclination of the backrest.

SUMMARY OF THE INVENTION

It is the object of the present invention to provide a backrest adjuster for a seat, in particular a vehicle seat, that is improved in comparison to the prior art.

The backrest adjuster has at least one fitting and a rotary bearing arranged opposite the latter and a transmission element connecting said fitting and rotary bearing to each other, wherein a bracing element which is fixed on the rotary bearing side, i.e. in the region of the rotary bearing, and on the fitting side, i.e. in the region of the opposite fitting, is provided. The bracing element here is surrounded by the transmission element in the region between the rotary bearing and the fitting.

The integration both of the transmission element carrying out the pivoting function and of the bracing element in the region of the pivot axis of the backrest adjuster makes possible a particularly simple and cost effective solution for a backrest adjuster. Furthermore, a load acting on the single sided fitting is conducted away directly into the substructure by means of the transmission element, in particular a simple tube, connecting the one fitting and the opposite rotary bearing, and therefore the single sided fitting is not overloaded.

In an advantageous embodiment, a fitting which has a fitting upper part and a fitting lower part is arranged in each case on the outer sides of the vehicle seat, wherein the fitting upper part is fixedly connected to the backrest and the fitting lower part is fastened to the vehicle floor by means of a floor side seat part structure.

In a further advantageous refinement, on a side of the vehicle seat opposite the one fitting, in the associated fitting lower part, a receptacle for the fastening of the transmission element is mounted on the rotary bearing.

In a further advantageous refinement, the transmission element is mounted in the floor side fitting lower part and projects on the end side on the outside of the fitting lower part.

Furthermore, it is possible for a clamping element to be arranged for the fixing of the transmission element on the fitting lower part.

In a further advantageous refinement, the rotary bearing side end of the bracing element is supported on the outer side of an associated fitting lower part. The other end of the bracing element is held here in the transmission element, in the region of the fitting side end thereof, with a force fit and/or form fit.

The bracing element is preferably formed integrally and has a substantially L shaped design. A first longer limb projects from the outside into the transmission element as far as an inner fixing. A second limb is supported on the rotary bearing.

In an advantageous refinement of the bracing element, the first limb is curved on the end side in a U shaped manner and has a rounded portion. This permits simple fitting of the bracing element into the tubular transmission element and form fitting securing of the bracing element in the transmission element. For this purpose, the transmission element preferably has, at the fitting side end, a receptacle for the form-fitting fixing of the bent over end of the first limb of the bracing element.

Exemplary embodiments of the invention are described in more detail below with reference to the attached schematic figures. The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Mutually corresponding parts are provided with the same reference signs in all of the Figures.

Figure 1:
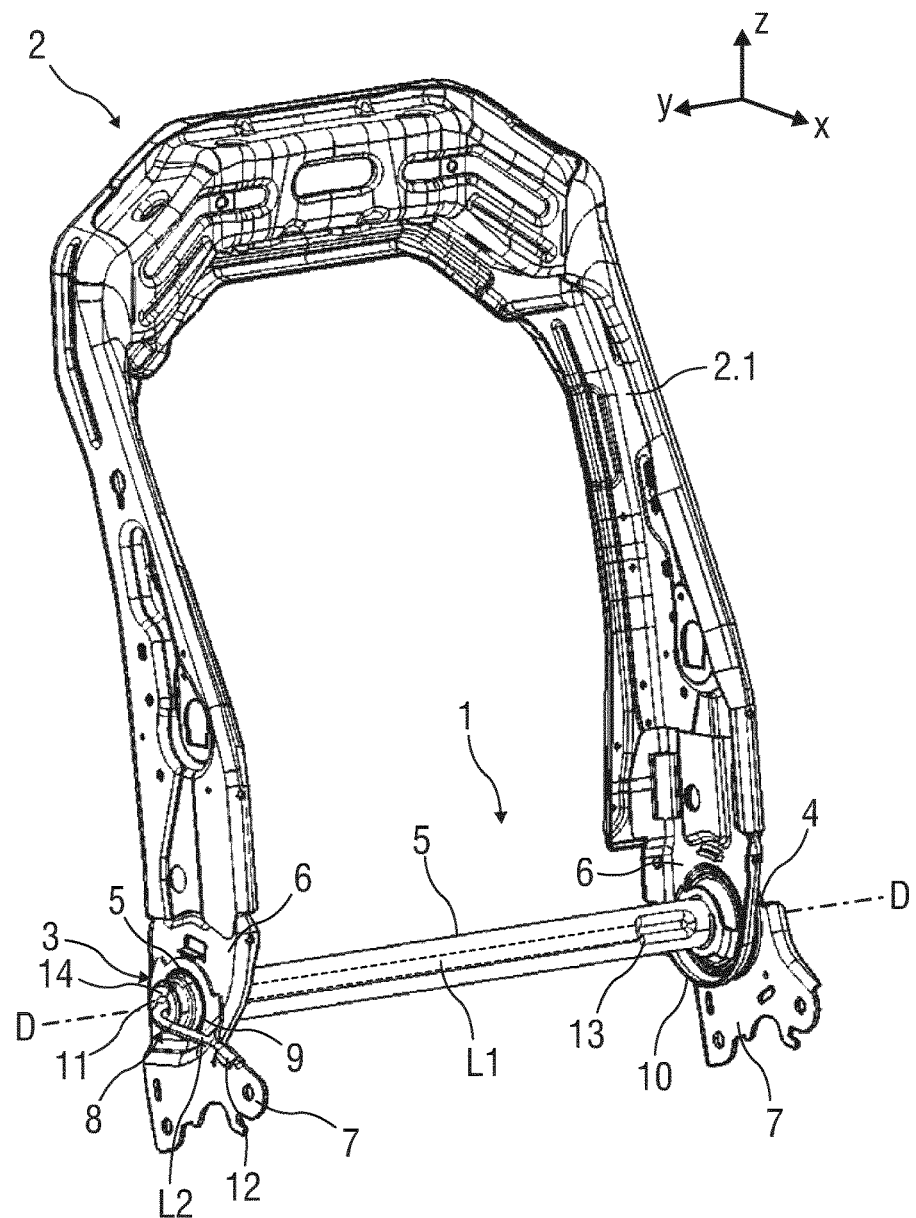
FIG. 1 is a schematic perspective view, obliquely from the front, showing a backrest adjuster with a transmission element which is fixed on the outside on both sides in the region of a pivot axis of a backrest of a seat, and with a bracing element which is encased at least in regions by the transmission element.
Figure 2:
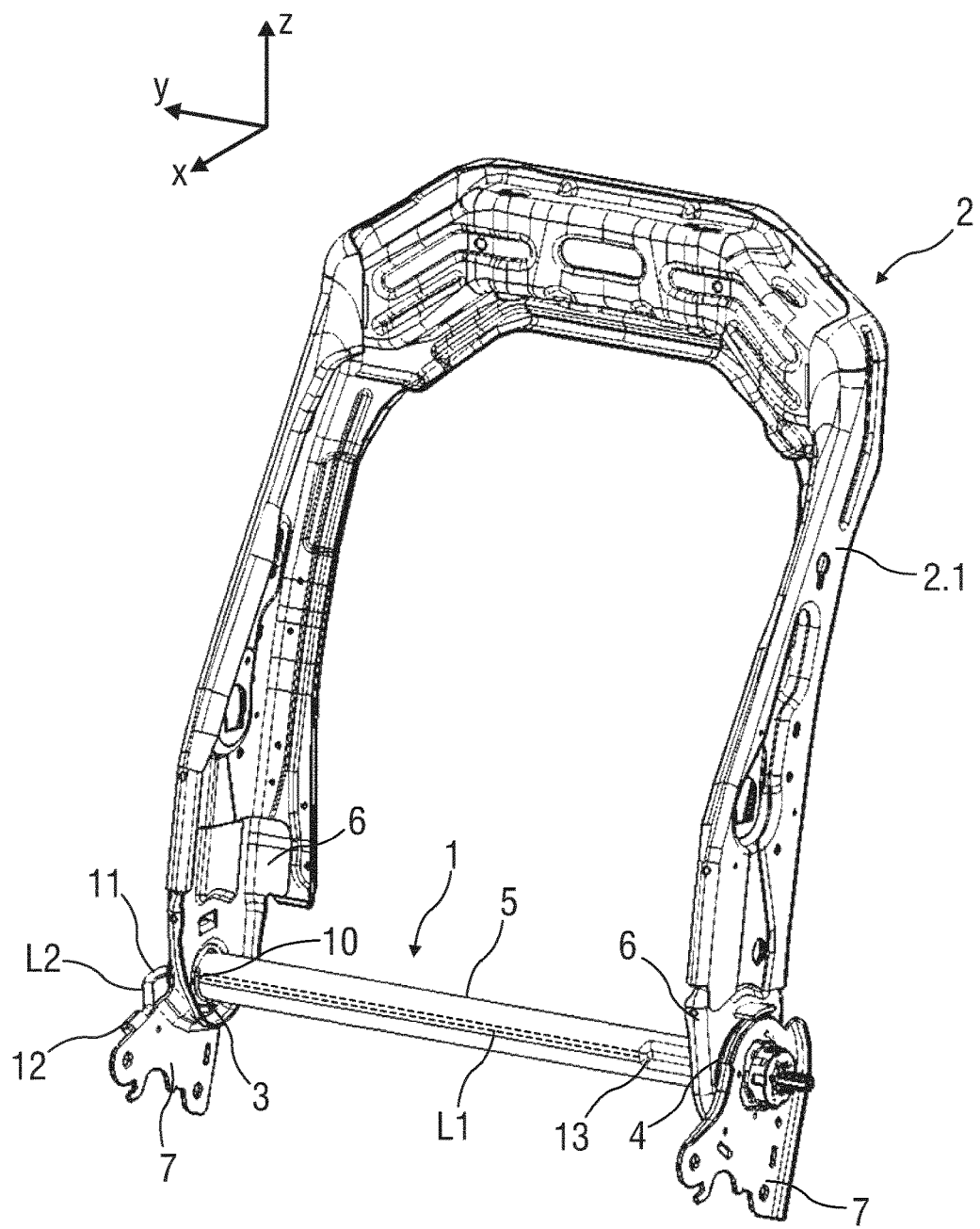
FIG. 2 is a schematic perspective view, obliquely from the front, showing the backrest adjuster according to FIG. 1 at a different angle.

FIGS. 1 and 2 show, in different perspective views obliquely from the front, a backrest adjuster 1 for a seat 2, in particular a vehicle seat. The seat 2 has at least one backrest 2.1 and a seat part (not illustrated specifically). The backrest 2.1 is arranged on the seat part so as to be pivotable by means of the backrest adjuster 1.

The backrest adjuster 1 comprises a rotary bearing 3 on one of the outer sides, on the left outer side from the front in the exemplary embodiment, for adjusting the inclination and for freely pivoting the backrest 2.1 relative to the seat part, and a fitting 4 on the opposite side. The fitting 4 and the opposite rotary bearing 3 are connected to each other by means of a transmission element 5, in particular a tube or a rod.

The transmission element 5 runs through a rotational or pivot axis D of the pivotable backrest 2.1. The transmission element 5 is designed as a hollow tube and couples the fitting 4 and the rotary bearing 3 along the rotational axis D.

A respective fitting upper part 6 fixed to the backrest and a respective fitting lower part 7 which is fixed to the seat part, in particular is fixed to the floor, are provided on both sides of the seat 2. The fitting lower part 7 is fastened here via a floor side seat part structure (not illustrated specifically) to the vehicle floor (not illustrated specifically).

A fitting 4 is arranged on the relevant outer side (on the right on the outside in the exemplary embodiment) of the seat 2 between the associated fitting upper part 6 and the associated fitting lower part 7 and is fixedly connected to the backrest 2.1.

As FIG. 1 shows, the rotary bearing 3 has a receptacle 8 for accommodating the transmission element 5 in the associated fitting lower part 7 on that side of the seat 2 which is opposite the fitting 4. A bearing bushing, for example composed of plastic, can be arranged in the receptacle in a manner not illustrated specifically.

The transmission element 5 mounted in the floor-side fitting lower part 7 protrudes on the end side on the outside of the fitting lower part 7. A clamping element 9 is provided for fixing the transmission element 5 to the fitting lower part 7. The clamping element 9 is designed in the manner of a clamping disk or fixing disk which fixes the rotary bearing side components of the backrest adjuster 1, the relevant end of the transmission element 5 and the relevant fitting lower part 7 to one another on the rotary bearing side.

As illustrated in FIG. 2, the transmission element 5 is guided on the rotary bearing side by the inner fitting upper part 6 and is fixed on the latter. For the rotary bearing side fixing of the transmission element 5 to the fitting upper part 6, the transmission element 5 is connected to the fitting upper part 6 in an integrally bonded manner, with a form fit and/or force fit and is therefore formed in a manner fixed to the backrest. For example, the transmission element 5 is welded on the inner side in the region of the rotary bearing 3 to the fitting upper part 6, as shown in FIG. 2 by way of a weld seam 10.

On the opposite side, and therefore on the fitting side, the transmission element 5 is likewise formed in a manner fixed to the backrest. For example, the fitting side end of the transmission element 5 is fastened to the inner fitting upper part 6 in an integrally bonded manner, with a form fit and/or force fit. In particular, the fitting side end of the transmission element 5 is welded to the fitting upper part 6, as shown in FIG. 1 by way of a further weld seam 10.

The transmission element 5 is therefore in each case welded and formed in a manner fixed to the backrest on both sides, i.e. on the rotary bearing side and fitting side, to the fitting upper parts 6, in particular on the inside.

During an adjustment operation of the backrest 2.1, when the fitting 4 is unlocked, the transmission element 5 therefore rotates together with the backrest 2.1 about the rotational axis D and takes on a pivoting function, wherein the transmission element 5 is mounted rotatably in the receptacle 8 on the rotary bearing side.

So that the fitting 4 is not overloaded as a consequence of mechanical stresses, the transmission element 5 is connected by means of the rotary bearing 3 via the fitting upper part 6 to the backrest 2.1 and via the fitting lower part 7 to the vehicle floor and therefore to the substructure. By accommodating the rotary bearing 3 in the floor side fitting lower part 7, mechanical stresses which occur are conducted away into the vehicle floor.

Furthermore, for a pretensioned adjustment of the inclination of the backrest 2.1 in relation to the seat part, the backrest adjuster 1 comprises a bracing element 11, the two ends of which are fixed or fixedly clamped in place. The bracing element 11 is in the form, for example, of a torsion spring.

The bracing element 11 is supported and mounted at one end on the rotary bearing side on the outer side of the associated fitting lower part 7, as can be seen in FIG. 1. For this purpose, a supporting bearing 12 is arranged on the outside of the rotary bearing side fitting lower part 7. The supporting bearing 12 is in the form of a tab, clip or sleeve which, for example, is formed from the fitting lower part 7 or is fixed on the latter.

The other, and therefore the fitting side, end of the bracing element 11 is held in the transmission element 5, in the region of the fitting side end thereof, with a force fit and/or form fit. For this purpose, the transmission element 5 comprises in particular an inwardly directed embossed structure 13 by means of which the fitting side end of the bracing element 11 is fixed in the transmission element 5.

The bracing element 11 is formed integrally from a metallic material, in particular spring steel, with a round or virtually round cross section and in a substantially L shaped manner. A first limb L1 is formed here with a length which is increased in comparison to a second limb L2.

As is apparent from FIG. 2, the end of the second limb L2 can be, for example, of wavy or S shaped design for accommodating said limb in the supporting bearing 12. It is illustrated in FIG. 1 how the second limb L2 is arranged and guided on the outside in the rotary bearing side end of the transmission element 5 by means of a stopper 14, in particular plastics stopper.

The first limb L1 is angled substantially at an angle of 90° to the second limb L2, which is supported on the rotary bearing side, and projects from the outside on the rotary bearing side into the hollow transmission element 5 as far as the fitting side inner fixing to the embossed structure 13 of the transmission element 5. The end of the first limb L1 projecting into the transmission element 5 can be rounded or bent, in particular bent in a U shaped manner, in order to facilitate installation and fixing of the bracing element 11 in the transmission element 5.

The first limb L1 of the bracing element 11 and the transmission element 5 in particular encasing the first limb L1 therefore run in the region of the rotational axis D in the transverse direction of the seat 2.

Such a compact arrangement of the components, such as of the rotary bearing 3, the fitting 4, the transmission element 5 and the bracing element 11 of the backrest adjuster 1, close to the rotational axis, permit a particularly simple and integrated design of the backrest adjuster 1.

In particular, the fixing of the bracing element 11 on both sides close to the rotational axis in the region of the fitting 4, in the transmission element 5 itself and in the region of the rotary bearing 3 on the outside in the supporting bearing 12, and the arrangement and fixing of the transmission element 5 itself close to the rotational axis on the fitting upper parts 6 constitute a particularly compact and simple embodiment for a backrest adjuster 1 and a seat 2 with such a backrest adjuster 1.

Figure 4:
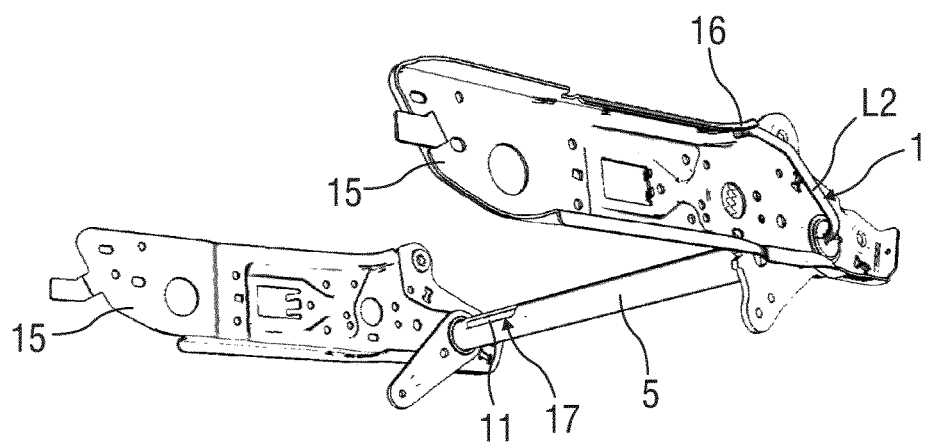
FIG. 4 is a perspective illustration of a portion of a seat structure with a bracing element which is designed as a torsion spring and is arranged in a transmission element.

FIG. 4 schematically illustrates a perspective illustration of a portion of the seat structure with the bracing element 11 which is designed as a torsion spring and is arranged at least in sections in the transmission element 5. The seat structure comprises at least two seat side cheeks 15 which are coupled to each other at least by means of the transmission element 5 fixed to the framework. Conventional seat adjustment elements may be arranged here on both sides of the transmission element 5. A seat cushion (not illustrated) of the seat surface is held between the seat side cheeks 15.

In the mounted vehicle seat, the first limb L1 is arranged completely or virtually completely in the transmission element 5, wherein the spring end of the torsion spring is held by its bent-over portion 11.3 in the transmission element 5 with a form fit. For example, a recess 17 is arranged on the transmission element 5, said recess being designed so as to correspond to the bent over portion 11.3 of the spring end, and therefore the bent over portion 11.3 of the first limb L1 can be arranged in the recess 17 of the transmission element 5 with a form fit. The transmission element 5 and the first limb L1 of the bracing element 11 are arranged here in the transverse direction of a vehicle.

The holding portion 11.1 of the second limb L2 is held on the holding element 16 of the seat side cheek 15. The holding element 16 is molded or formed laterally on the seat side cheek 15 and, for example, in the form of a beveling corresponding to the holding portion 11.1 of the second limb L2, on the seat side cheek 15.

Figure 3:
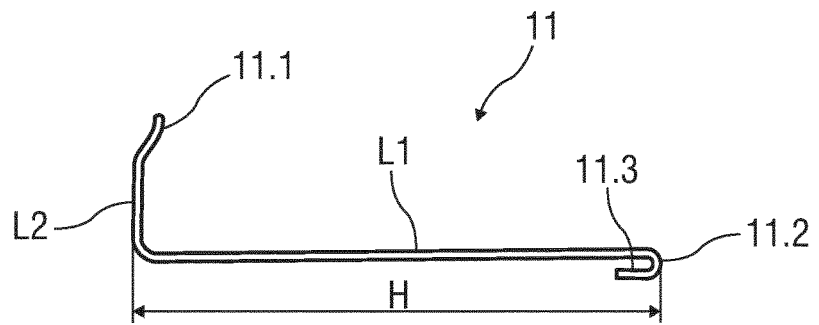
FIG. 3 is a schematic top view showing a bracing element according to the invention.

FIG. 3 schematically illustrates a bracing element 11 according to the invention. Said bracing element is effective as a torsion spring and is formed integrally from a metallic material, for example spring steel, with a round or virtually round cross section and in a substantially L shaped manner, wherein the first limb L1 has a length which is increased in comparison to the second limb L2.

The holding portion 11.1 is formed on the end side of the second limb L2 and is designed so as to correspond to a holding element 16 (illustrated in FIG. 4) on a seat structure. The spring end of the first limb L1 is bent in a U shaped manner on the end side and ends in the bent over portion 11.3 such that a region of the spring end runs parallel or virtually parallel to the first limb L1, and the first limb L1 has a rounded portion 11.2 on the end side. As a result, a large effective spring length is advantageously achieved. The rounded portion 11.2 of the spring end of the torsion spring permits particularly simple installation of the first limb L1 of the bracing element 11 in the tubular transmission element 5. The holding portion 11.1 of the second limb L2 is held on the holding element 16 of the seat side cheek 15. The holding element 16 is arranged laterally on the seat side cheek 15 and is configured as a beveling, which corresponds to the holding portion 11.1 of the second limb L2, on the seat side cheek 15.

FIG. 4 schematically illustrates a perspective illustration of a portion of the seat structure with the bracing element 11, which is arranged at least in sections in the transmission element 5. The seat structure comprises at least two seat side cheeks 15 which are coupled to each other at least by means of the transmission element 5 fixed to the framework. Conventional seat adjustment elements may be arranged here on both sides of the transmission element 5. A seat cushion (not illustrated) of the seat surface is held between the seat side cheeks 15.

In the mounted vehicle seat, the first limb L1 is arranged completely or virtually completely in the transmission element 5, wherein the bent over spring end 11.3 of the bracing element 11, which is designed as a torsion spring, is held in the transmission element 5 with a form fit. For example, a recess 17 is arranged on the transmission element 5, said recess being designed in a manner corresponding to the spring end, and therefore the bent over spring end 11.3 of the first limb L1 is secured in the recess 17 of the transmission element 5 with a form fit. The transmission element 5 and the first limb L1 of the torsion spring are arranged here in the transverse direction of a vehicle.

Figure 5:
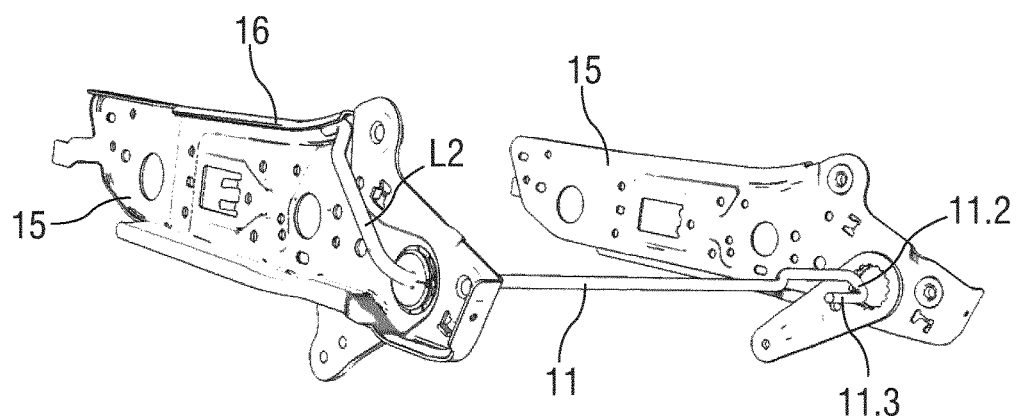
FIG. 5 is a perspective illustration of a portion of a seat structure with a bracing element designed as a torsion spring.

FIG. 5 schematically shows a perspective illustration of a portion of the seat structure with a bracing element 11. The tubular transmission element 5 has been blanked out here in order to make the profile of the bracing element 11, which is designed as a torsion spring, within the transmission element 5 visible.

In the mounted vehicle seat, the first limb L1 is arranged completely or virtually completely in the transmission element 5, wherein the spring end is held in the transmission element 5 with a form-fit. For example, a recess is arranged in the transmission element 5, said recess being designed in a manner corresponding to the configuration of the spring end, and therefore the spring end of the first limb L1 is held in the recess with a form fit.

While specific embodiments of the invention have been shown and described in detail to illustrate the application of the principles of the invention, it will be understood that the invention may be embodied otherwise without departing from such principles.

The invention claimed is:

1. A backrest adjuster for a vehicle seat for adjusting the inclination of a backrest of a vehicle seat, the backrest adjuster comprising:
    a fitting on one side of the vehicle seat;
    a rotary bearing on another side of the vehicle seat, that is opposite to the fitting;
    a transmission element coupled on the one side to the fitting and on the other side to the rotary bearing; and
    a clamping element fixed in an area of the rotary bearing and fixed in a region of the fitting, wherein the clamping element is formed in a L-shaped manner, the clamping element comprising a first limb and a second limb and at least a portion of the clamping element being arranged in the transmission element in a region between the rotary bearing and the fitting.

2. The backrest adjuster as claimed in claim 1, wherein the transmission element is configured as a tube.

3. The backrest adjuster as claimed in claim 1, further comprising another fitting, wherein each fitting has a fitting upper part and a fitting lower part is arranged in each case on the outer sides of the vehicle seat, wherein the fitting upper part is fixedly connected to the backrest and the fitting lower part is fastened to the vehicle floor by means of a floor-side seat part structure.

4. The backrest adjuster as claimed in claim 3, wherein, on a side of the vehicle seat opposite the one fitting, the rotary bearing has, in an associated fitting lower part, a receptacle for fastening the transmission element.

5. The backrest adjuster as claimed in claim 3, wherein the transmission element is mounted in the floor-side fitting lower part and projects on an end side on the outside of the fitting lower part.

6. The backrest adjuster as claimed in claim 3, further comprising another clamping element arranged for fixing the transmission element on the fitting lower part.

7. The backrest adjuster as claimed in claim 3, further comprising a bracing element for a pretensioned adjustment of the inclination of the backrest in relation to a seat part, the clamping element being supported at one end, on the rotary-bearing side, on the outer side of the associated fitting lower part, wherein the other end of the clamping element is held in the transmission element, in the region of the fitting-side end thereof, with a force-fit or form-fit or both a force-fit and form-fit.

8. The backrest adjuster as claimed in claim 1, wherein the clamping element is formed integrally, wherein the first limb projects from outside into the transmission element as far as an inner fixing, and the second limb is supported on the rotary bearing.

9. The backrest adjuster as claimed in claim 8, wherein the first limb of the clamping element is bent in a U-shaped manner on an end side and has a rounded portion.

10. The backrest adjuster as claimed in claim 1, wherein the transmission element has, at a fitting-side end, a receptacle for form-fitting fixing of the bent-over end of the first limb of the clamping element.

11. A vehicle seat comprising:
 a backrest which is adjustable in inclination about a pivot axis;
 a backrest adjuster comprising:
 a fitting on one side of the backrest adjuster;
 a rotary bearing on another side of the backrest adjuster, that is opposite to the fitting;
 a transmission element coupled on the one side to the fitting and on the other side to the rotary bearing, the transmission element comprising a transmission element inner surface, the transmission element inner surface defining a transmission element inner space; and
 a clamping element fixed in an area of the rotary bearing and fixed in a region of the fitting and at least a portion of the clamping element is arranged in the transmission element inner space in a region between the rotary bearing and the fitting.

12. A vehicle seat as claimed in claim 11, wherein the transmission element is configured as a tube, wherein the clamping element comprises a first limb and a second limb, said first limb being bent relative to the second limb to define a L-shape contour of the clamping element.

13. A vehicle seat as claimed in claim 11, further comprising another fitting wherein each fitting has a fitting upper part and a fitting lower part is arranged in each case on the outer sides of the vehicle seat, wherein the fitting upper part is fixedly connected to the backrest and the fitting lower part is fastened to the vehicle floor by means of a floor-side seat part structure.

14. A vehicle seat as claimed in claim 13, wherein, on a side of the vehicle seat opposite the one fitting, the rotary bearing has, in the associated fitting lower part, a receptacle for fastening the transmission element.

15. A vehicle seat as claimed in claim 13, wherein the transmission element is mounted in the floor-side fitting lower part and projects on the end side on the outside of the fitting lower part.

16. A vehicle seat as claimed in claim 13, further comprising a clamping element arranged for the fixing of the transmission element on the fitting lower part.

17. A vehicle seat as claimed in claim 13, further comprising a bracing element for a pretensioned adjustment of the inclination of the backrest in relation to a seat part, the clamping element being supported at one end, on the rotary-bearing side, on the outer side of the associated fitting lower part, wherein the other end of the clamping element is held in the transmission element, in the region of the fitting-side end thereof, with a force-fit or form-fit or both a force-fit or form-fit.

18. A vehicle seat as claimed in claim 11, wherein the clamping element is formed integrally and in a substantially L-shaped manner, wherein a first limb projects from outside into the transmission element as far as an inner fixing, and a second limb is supported on the rotary bearing.

19. A vehicle seat as claimed in claim 18, wherein the first limb of the clamping element is bent in a U-shaped manner on the end side and has a rounded portion.

20. A vehicle seat as claimed in claim 11, wherein the transmission element has, at a fitting-side end, a receptacle for form-fitting fixing of the bent-over end of the first limb of the clamping element.

* * * * *